US008057295B2

(12) United States Patent
Vann et al.

(10) Patent No.: US 8,057,295 B2
(45) Date of Patent: Nov. 15, 2011

(54) WAGERING GAME HAVING AWARD GROUP SELECTION FEATURE

(75) Inventors: Jamie W. Vann, Chicago, IL (US); James V. Palermo, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 623 days.

(21) Appl. No.: 12/291,425

(22) Filed: Nov. 10, 2008

(65) Prior Publication Data

US 2010/0120508 A1 May 13, 2010

(51) Int. Cl.
*G06F 17/00* (2006.01)
*G06F 19/00* (2006.01)
*A63F 9/24* (2006.01)
*A63F 13/00* (2006.01)

(52) U.S. Cl. ............ 463/20; 463/16; 463/25; 273/138.1

(58) Field of Classification Search .............. 463/16–20, 463/25, 29–31; 273/138.1, 139
See application file for complete search history.

(56) References Cited

U.S. PATENT DOCUMENTS

| | | | | |
|---|---|---|---|---|
| 5,931,467 | A * | 8/1999 | Kamille | 273/139 |
| 5,996,997 | A * | 12/1999 | Kamille | 273/139 |
| 6,089,976 | A * | 7/2000 | Schneider et al. | 463/16 |
| 6,174,235 | B1 * | 1/2001 | Walker et al. | 463/25 |
| 6,572,471 | B1 * | 6/2003 | Bennett | 463/16 |
| 6,585,591 | B1 * | 7/2003 | Baerlocher et al. | 463/25 |
| 6,592,457 | B1 * | 7/2003 | Frohm et al. | 463/16 |
| 6,602,137 | B2 * | 8/2003 | Kaminkow et al. | 463/16 |
| 6,688,977 | B1 | 2/2004 | Baerlocher et al. | |
| 6,802,775 | B2 * | 10/2004 | Baerlocher et al. | 463/16 |
| 6,964,416 | B2 * | 11/2005 | McClintic et al. | 273/273 |
| 7,104,886 | B2 | 9/2006 | Baerlocher et al. | |
| 7,175,523 | B2 * | 2/2007 | Gilmore et al. | 463/16 |
| 7,182,689 | B2 * | 2/2007 | Hughs-Baird et al. | 463/20 |
| 7,273,415 | B2 * | 9/2007 | Cregan et al. | 463/25 |
| 7,291,066 | B2 * | 11/2007 | Gauselmann | 463/16 |
| 7,300,348 | B2 * | 11/2007 | Kaminkow et al. | 463/17 |
| 7,303,469 | B2 | 12/2007 | Kaminkow | |
| 7,431,645 | B2 * | 10/2008 | Han et al. | 463/16 |
| 7,585,218 | B2 * | 9/2009 | Mead et al. | 463/20 |
| 7,628,690 | B2 * | 12/2009 | Englman et al. | 463/17 |
| 2003/0100358 | A1 * | 5/2003 | Kaminkow | 463/20 |
| 2003/0130025 | A1 * | 7/2003 | Gilmore et al. | 463/16 |
| 2003/0153383 | A1 * | 8/2003 | Baerlocher et al. | 463/25 |
| 2005/0192081 | A1 * | 9/2005 | Marks et al. | 463/20 |
| 2006/0079316 | A1 * | 4/2006 | Flemming et al. | 463/25 |
| 2007/0060275 | A1 | 3/2007 | Gilmore et al. | |
| 2008/0004105 | A1 | 1/2008 | Cregan et al. | |
| 2008/0108421 | A1 | 5/2008 | Hornik et al. | |

* cited by examiner

*Primary Examiner* — Milap Shah
(74) *Attorney, Agent, or Firm* — Nixon Peabody LLP

(57) ABSTRACT

A method of conducting a wagering game comprises receiving a wager from a player, and displaying a plurality of selectable elements arranged in an array, each of the selectable elements associated with a respective outcome. The method further comprises receiving a plurality of selections of the selectable elements, and after receiving the plurality of selections, revealing the outcomes associated with the selected elements. For each outcome which comprises an award, the award is provided to the player. For each outcome which comprises an expander element, outcomes associated with all selectable elements in a direction of expansion associated with the expander element are revealed, and if any such revealed outcomes comprise an award, the award is provided to the player.

27 Claims, 12 Drawing Sheets

WAGERING GAME HAVING AWARD GROUP SELECTION FEATURE

COPYRIGHT

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a gaming machine that conducts a selection game in which a player's selection of an expander element triggers an award of a predetermined group of awards, such as all awards in a column and/or row of the selected element.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

One concept that has been successfully employed to enhance the entertainment value of a game is the concept of a player selecting elements on the screen, which can award a credit amount. Because this game concept offers tremendous advantages in player appeal and excitement relative to other known games, and because such games are attractive to both players and operators, there is a continuing need to develop gaming systems with new types of such games to satisfy the demands of players and operators.

SUMMARY OF THE INVENTION

According to one aspect of the present invention, a method of conducting a wagering game, the method comprises receiving a wager from a player, and displaying a plurality of selectable elements arranged in an array, each of the selectable elements associated with a respective outcome. The method further comprises receiving a plurality of selections of the selectable elements, and after receiving the plurality of selections, revealing the outcomes associated with the selected elements. For each outcome which comprises an award, the award is provided to the player. For each outcome which comprises an expander element, outcomes associated with all selectable elements in a direction of expansion associated with the expander element are revealed, and if any such revealed outcomes comprise an award, such award is provided to the player.

According to another aspect of the present invention, a gaming system for conducting a wagering game comprises a wager input device receiving a wager from a player associated with the wagering game, at least one display, and at least one controller. The controller is operative to (i) cause the display to display the wagering game, the wagering game comprising a plurality of selectable elements arranged in a geometric array, (ii) detect receipt of a plurality of selections of the selectable elements, (iii) after receiving the plurality of selections, reveal the outcomes associated with the selected elements, (iv) for each outcome which comprises an award, provide the award to the player, and (v) for each outcome which comprises an expander element, reveal outcomes associated with all selectable elements in a direction of expansion associated with the expander element, and if any such revealed outcomes comprise an award, provide such award to the player.

According to yet another aspect of the present invention, a method of conducting a wagering game comprises receiving a wager from a player and displaying a plurality of selectable elements arranged in an array comprising a plurality of rows and columns, each of the selectable elements associated with a respective outcome. The method further comprises populating the selectable elements with a plurality of award elements and a plurality of expander elements according to one of (i) locating a respective horizontal expander element in each row of the award elements, and locating a further respective vertical expander element in at least one column of the award elements, and (ii) locating a respective vertical expander element in each column of the award elements, and locating a further respective horizontal expander element in at least one row of the award elements. The method further comprises receiving a plurality of selections of the selectable elements, and after receiving the plurality of selections, revealing the outcomes associated with the selected elements. For each outcome which comprises an award, the award is provided to the player. For each outcome which comprises an expander element, outcomes associated with all selectable elements in a direction of expansion associated with the expander element are revealed, and if any such revealed outcomes comprise an award, such award is provided to the player.

According to yet another aspect of the present invention, a method of conducting a wagering game comprises receiving a wager from a player, displaying a plurality of selectable elements arranged in an array including a plurality of rows and columns, and populating the selectable elements with a plurality of award elements and a plurality of expander elements, each of the plurality of award elements being associated with a respective award. The method further comprises assigning a first direction of expansion to a set of first expander elements of the plurality of expander elements, and assigning a second direction of expansion to at least one second expander element of the plurality of expander elements, the second direction of expansion being different from the first direction of expansion. The method further comprises receiving a plurality of selections of the selectable element and after receiving the plurality of selections, revealing an outcome associated with each selected element. In response to selecting an award element, an award associated with the selected award element is awarded. In response to selecting a first expander element, each award associated with each award element lying in the first direction is awarded. In response to selecting the at least one second expander element, each award associated with each award element lying in the second direction is awarded.

According to yet another aspect of the present invention, a gaming system for conducting a wagering game comprises a wager input device receiving a wager, a display for displaying a wagering game, and at least one controller. The controller is operative to (i) cause the display to display the wagering game which comprises a plurality of selectable elements arranged in a geometric array, (ii) populate the selectable elements with a plurality of award elements and a plurality of expander elements, each of the plurality of award elements having an association with a respective award, (iii) assign a first direction of expansion to a set of first expander elements of the plurality of expander elements, and assign a second direction of expansion to the at least one second expander element of the plurality of expander elements, the second direction being different from the first direction of expansion, (iv) detect receipt of a plurality of selections of the selectable elements, (v) in response to a selected element being an award element, award an award associated with the selected award element, (vi) in response to a selected element being a first expander element, award each award associated with each award element lying in the first direction, and (vii) in response to a selected element being the second expander element, award each award associated with each award element lying in the second direction.

According to yet another aspect of the invention, one or more computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1A:
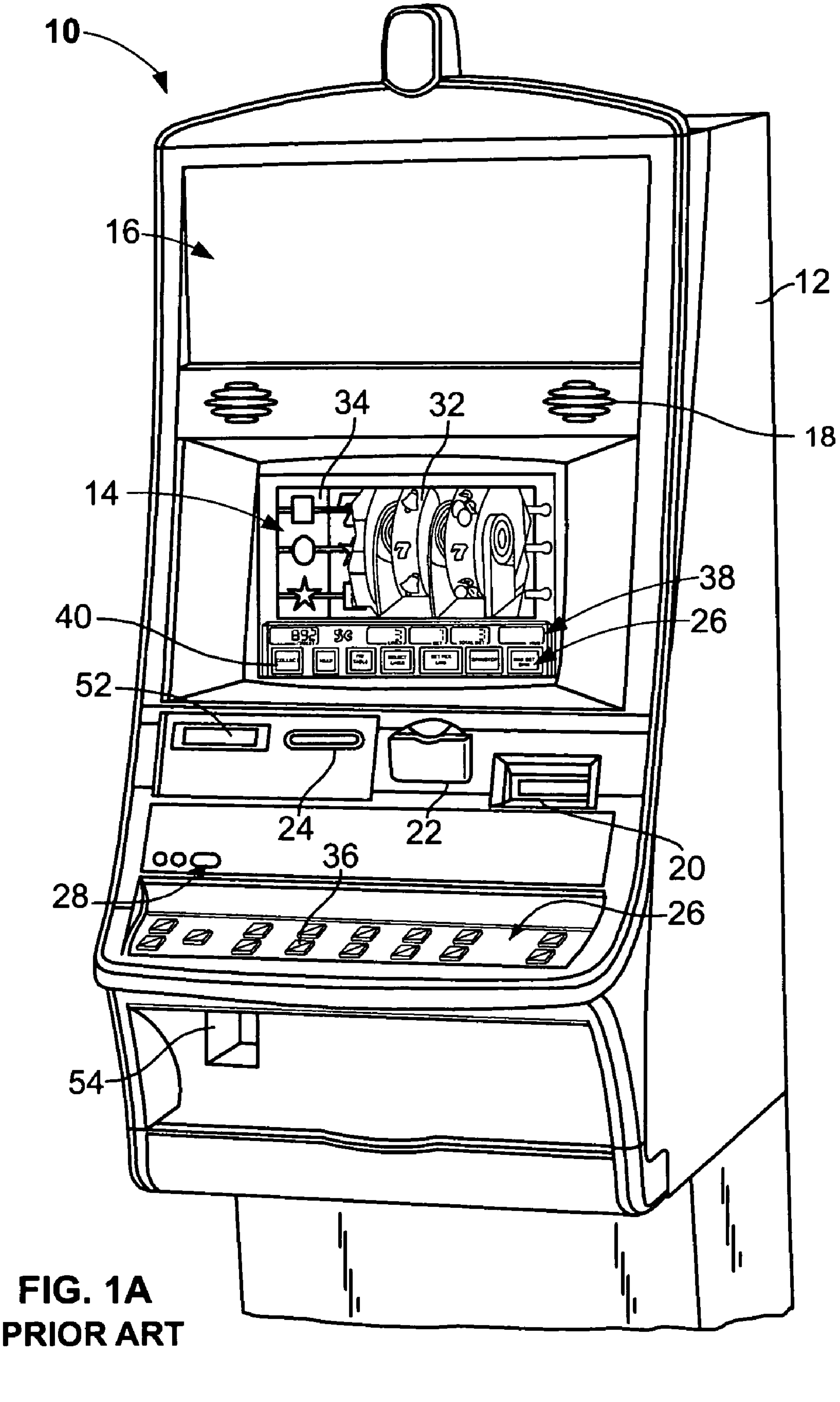
FIG. 1A PRIOR ART
FIG. 1*a* is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
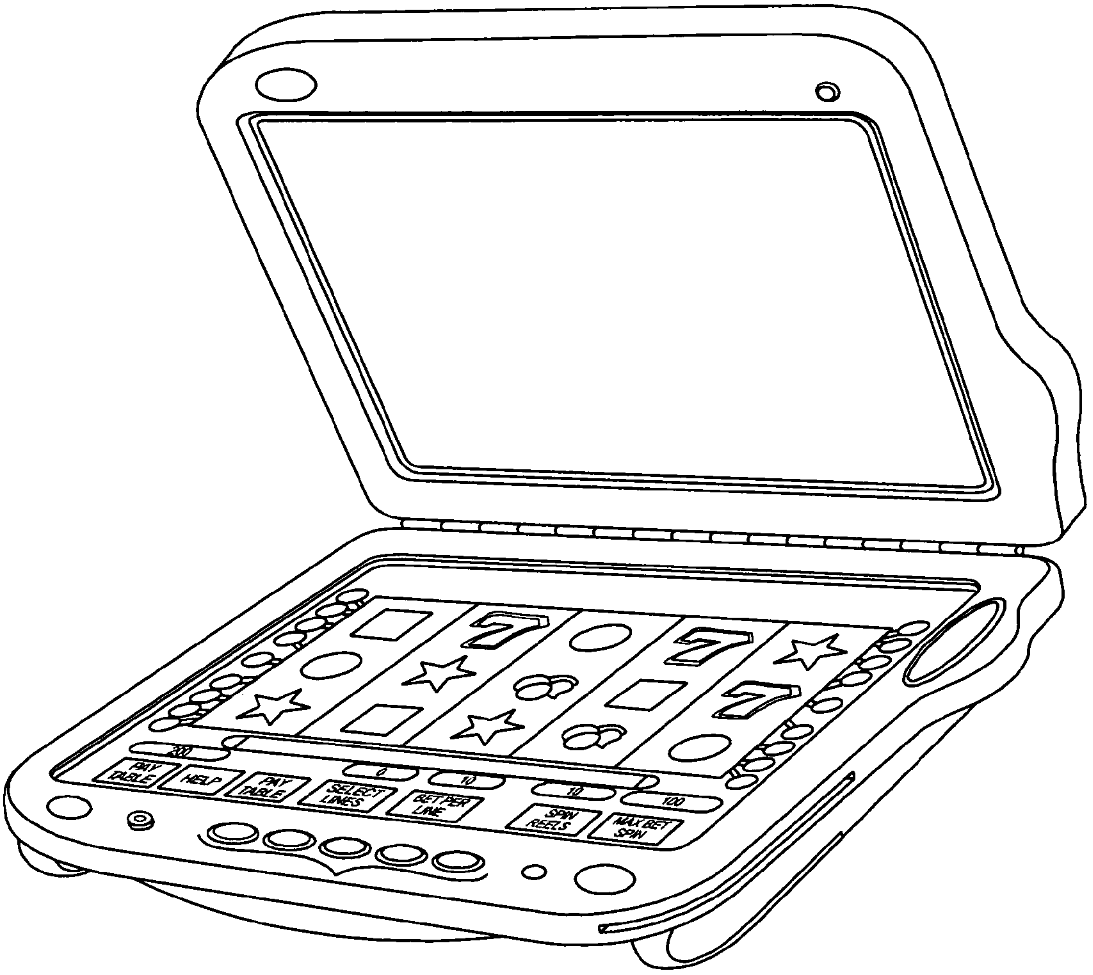
FIG. 1B PRIOR ART
FIG. 1*b* is a perspective view of a handheld gaming terminal according to an embodiment of the present invention.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
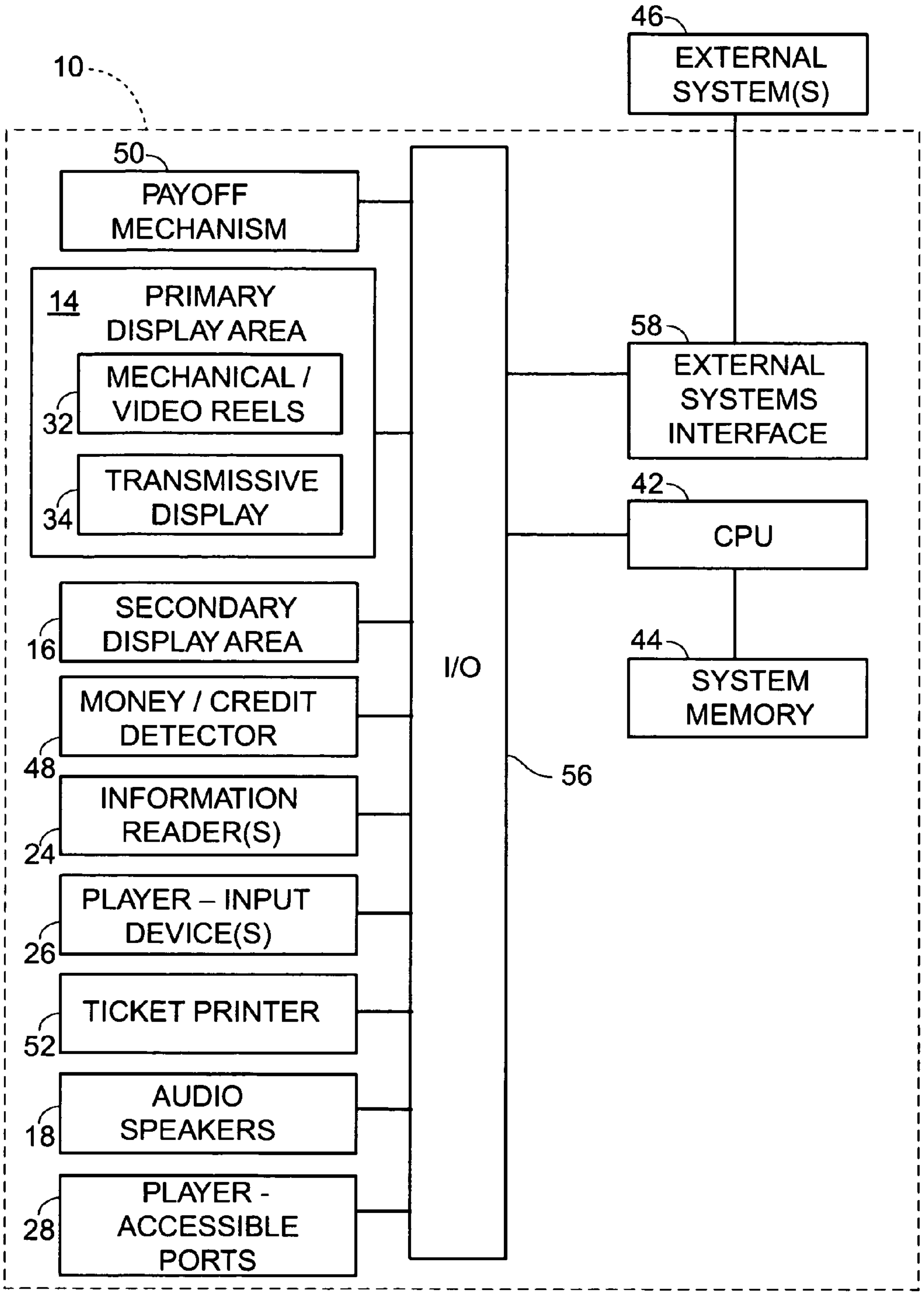
FIG. 2 PRIOR ART
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game (s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10 bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
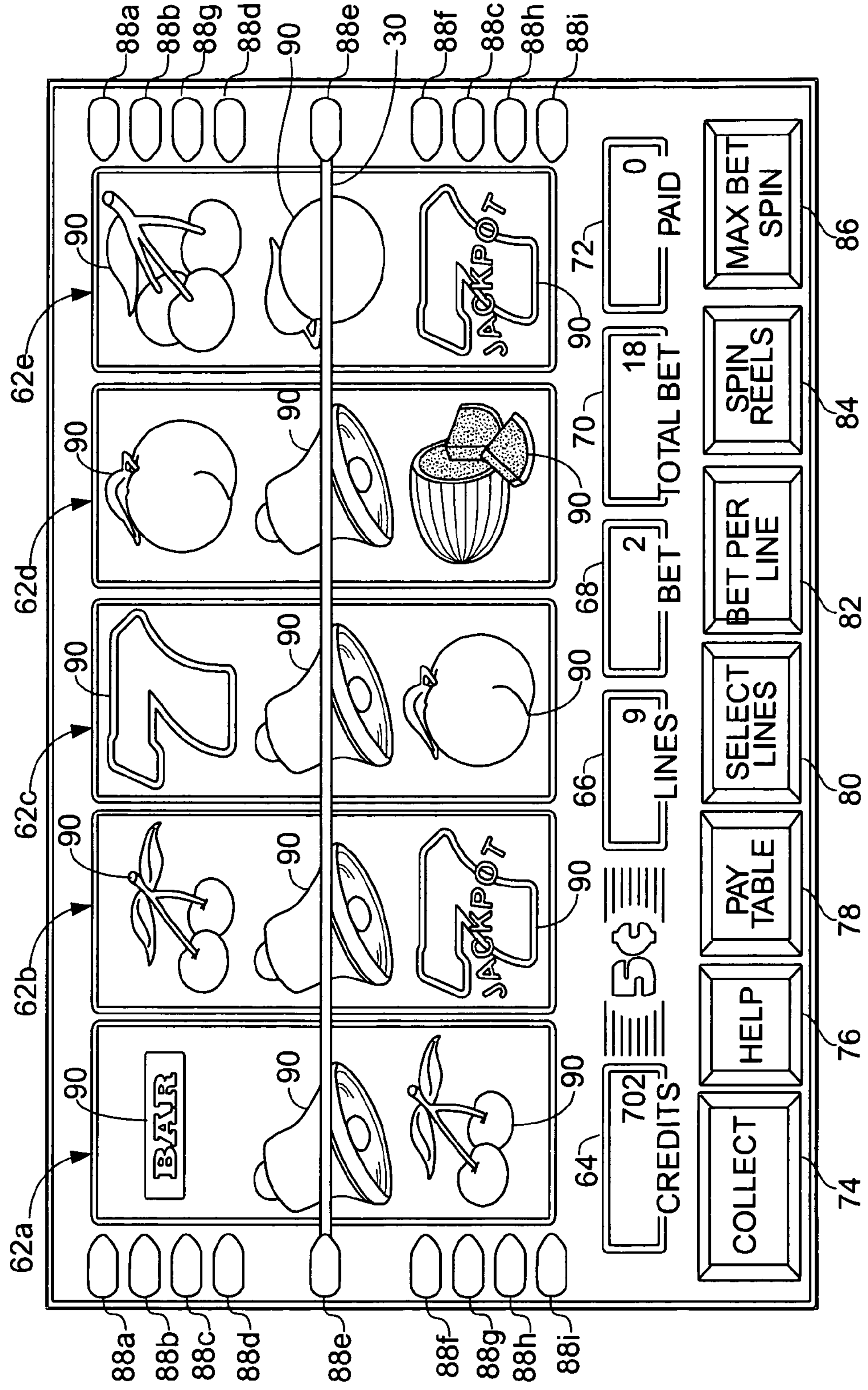
FIG. 3 PRIOR ART
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
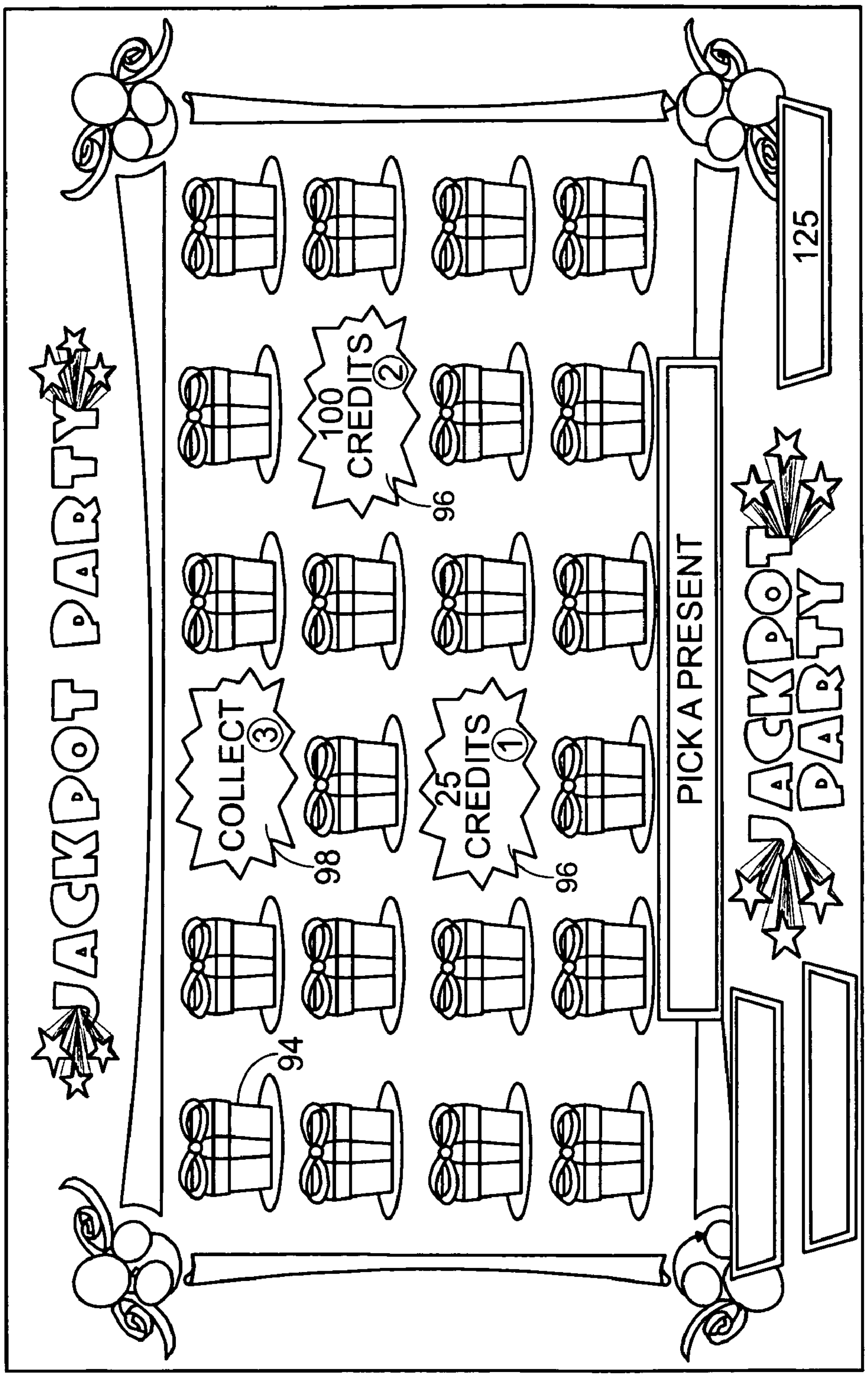
FIG.4 PRIOR ART
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Embodiments of the present method and apparatus have an "ALL" feature in a selection type game. The "ALL" feature implements the awarding of a group of awards, for example a column/row of awards, and possibly the triggering of the feature multiple times from one selection. According to one embodiment seven "ALL" expander elements may be placed in a grid of selectable elements. The grid may be formed of rows and columns and populated with expander elements and award elements, generally referred to as selectable elements. Six expander elements may be distributed with one in each row, or one in each column, depending on the direction of their awards. The seventh expander element is then randomly placed in the grid. A player, after learning the rules of the distribution of the "ALL"s through the grid, may choose a strategy of picking. However this will not increase the expected value (EV) of the selected awards, but may dampen the volatility of the picks overall. If they choose an entire row of selectable elements, or an entire column of selectable elements, they have greater than a fifty-fifty chance of getting an "ALL", but they are greatly reducing the chances of getting multiple "ALL" awards in one bonus. In this way, a player who learns the mechanics of a population algorithm of the system may control or affect the volatility of his awards.

Figure 5:
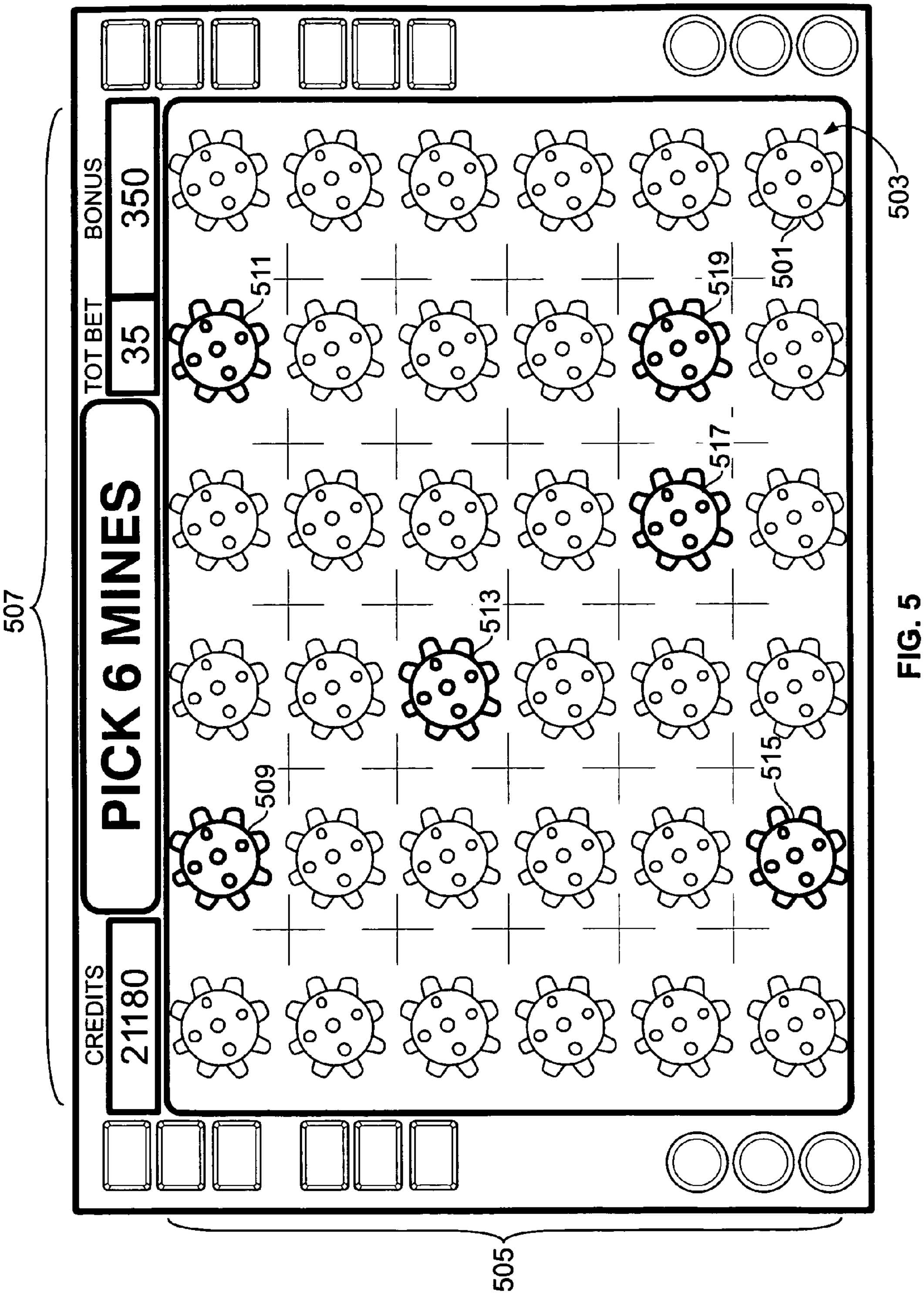
FIG. 5 is an image of a selection screen of a wagering game that may be displayed on a gaming terminal, according to an embodiment of the present invention.

FIG. 5 is an image of a selection screen of a wagering game that may be displayed on a gaming terminal, according to an embodiment of the present method and apparatus. The selection screen may be displayed on any appropriate display of a gaming terminal, such as the gaming terminals depicted and described with reference to FIGS. 1*a* and 1*b*. The selection game displayed in FIGS. 5-11 may comprise a primary wagering game itself, or may be a bonus or supplemental game, which is displayed in response to the occurrence of a triggering event. Once the selection game begins, the player is presented with a display, which may display instructions, such as "PICK 6 MINES". Also depicted may be such game items as current credits for the player, the player's total bet, and credits earned in a bonus game. A plurality of selectable elements 501 are also displayed. In this game the selectable elements 501 are mines that are exploded to reveal outcomes.

In FIG. 5, a plurality of mines (selectable elements) 501 are arranged in a matrix, array or grid 503 that has six rows 505 and six columns 507. During play of the game, the player is permitted to make selections of six mines, such as 509, 511, 513, 515, 517, 519, which are shown as already having been selected. After the player has selected six mines, the mines 509, 511, 513, 515, 517, 519 are then exploded revealing respective outcomes associated with each selected element. In other words, the outcomes are not revealed until after the player has made all of his selections. The player may make such selections via any appropriate player input device, such as those discussed herein. For example, a player may make selections via a touch screen overlying the selection display, or via appropriate buttons. In alternative embodiments, the player may be permitted to make fewer or greater selections of the selectable elements 501.

Other embodiments of the present method and apparatus may have matrices comprising more or less than six rows and six columns of selectable elements. Also, some embodiments may have matrices of selectable elements having a number of rows, which is different from the number of columns. Numerous other geometries may be utilized with the present method and apparatus that have many different rows of selectable elements that are oriented at different angles to one another. Thus, although a rectangular matrix or grid 503 is displayed in the FIGURES, other non-rectangular configurations may be used. It should be understood that the matrix 503 may take on any of these various configurations.

The selectable elements may be depicted and associated with many different types of symbols that may include any variety of graphical symbols, elements, or representations, including symbols which are associated with one or more themes of the gaming machine or system. The symbols may also include a blank symbol, or empty space. Selecting a symbol or selectable element may produce an outcome that is associated with an award. Also, a combination of symbols may produce a winning outcome for which an award may be paid in accordance with a paytable of the gaming device. This award may be in addition to individual awards associated with the selected symbols and revealed after their selection.

Figure 6:
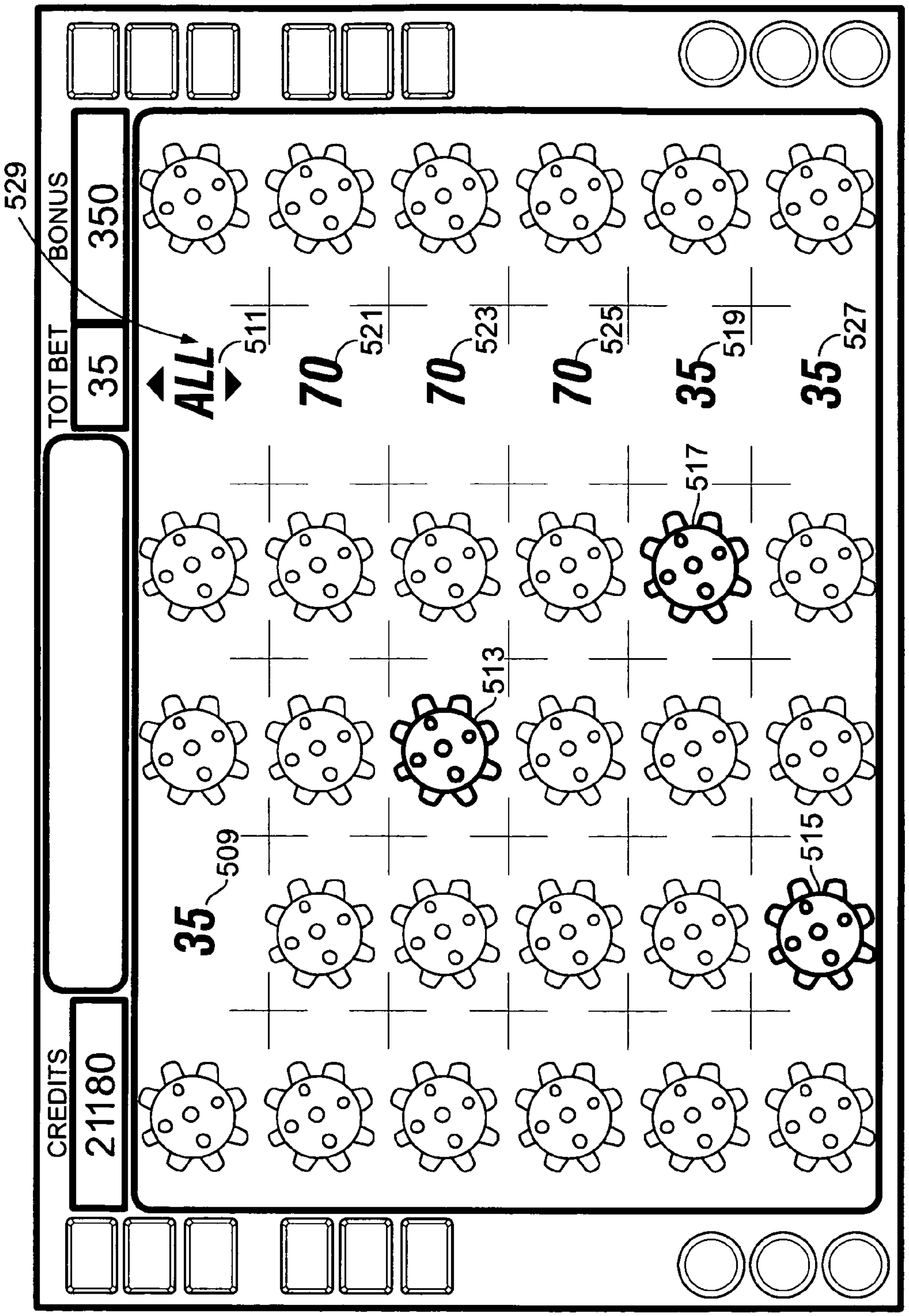
FIG. 6 is an image of a selection screen of a wagering game that may be displayed on a gaming terminal, according to an embodiment of the present invention in which all elements in a column are awarded for picking an expander element.

FIG. 6 is an image of a selection screen of a wagering game that may be displayed on a gaming terminal, according to an embodiment of the present invention in which all elements in a column are awarded for picking an expander element. In FIG. 6, the selection game of FIG. 5 is displayed after all six selections have been made by the player, and revealing of the selected elements has commenced. In an embodiment, the outcomes of the selected elements are revealed in the same order in which the selectable elements were selected (e.g., first selected mine is exploded and revealed first, then second selected mine is exploded and revealed second, etc.) The outcome of picking mine 509 results in an award of "35 credits", which is awarded to the player. In this case, because the selected element 509 is associated with an award (an amount of credits), the selectable element 509 is referred to as an award element. Revealing the next selected element 511, the outcome of picking mine 511 results in a "vertical ALL" outcome which in an expander element, specifically an expander element that expands vertically along a column. When the vertical expander element 511 is chosen the outcomes of all selectable elements 511, 521, 523, 525, 519, 527 in the respective column 529 are revealed and all respective awards associated therewith are awarded to the player. Thus, by selecting an expander element, a player is awarded with a group of awards associated with that expander element. In one embodiment, the expander elements comprise all awards across an entire row (horizontal ALL) or across an entire column (vertical ALL). In other embodiments, the expander elements may be associated with other groups of selectable elements, in a variety of geometric, even non-linear configurations.

Furthermore, since mine 519 was initially selected by the player (see FIG. 5), the associated award of "35" is awarded again as a result of the "vertical ALL" expander element associated with mine 511. This results in the 35 credit award associated with mine 519 being awarded twice (35+35=70) to the player. Thus, in an embodiment, selection and revealing of an expander element causes awarding of all awards in the geometric pattern associated with the expander element, regardless of whether or not such awards in the pattern had been previously awarded. If so, then the expander element causes re-awarding of the previously awarded award. This may be reinforced visually, for example, by exploding the mine each time the award is being awarded to the player. In an embodiment, one or more of the expander elements are assigned a first direction of expansion and one or more of the expander elements are assigned a second direction of expansion. The first direction of expansion is different from the second direction of expansion. For example, the first direction of expansion may be in the direction of columns, and the second direction of expansion may be in the direction of rows.

Figure 7:
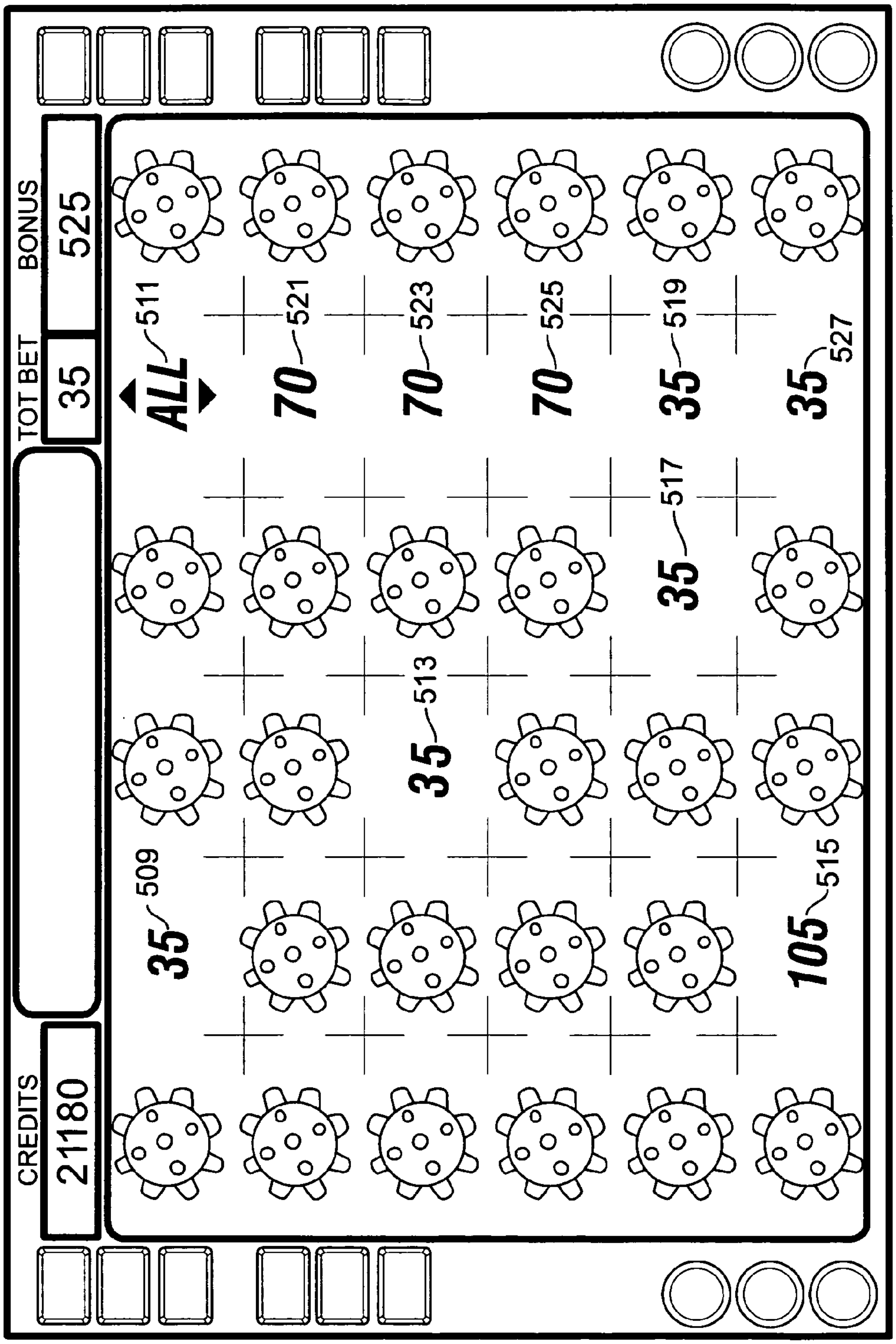
FIG. 7 is an image of a selection screen of a wagering game that may be displayed on a gaming terminal, according to an embodiment of the present invention in which outcomes of all selected elements are revealed.

FIG. 7 is an image of a selection screen of a wagering game that may be displayed on a gaming terminal, according to an embodiment of the present method and apparatus in which outcomes of all selected elements (from FIG. 5) are revealed. All outcomes have now been revealed for the selected mines 509, 511, 513, 515, 517, 519, and the respective awards are awarded to the player. Depending on the selections by the player, there may be a number of "horizontal ALL" awards in one or more rows, and a number of "vertical ALL" awards in one or more columns.

In this example, the revealed outcome of selected selectable outcome 509 is an award of "35", of selected selectable outcome 513 is an award of "35", of selected selectable outcome 515 is an award of "105", of selected selectable outcome 517 is an award of "35", and of selected selectable outcome 519 is an award of "35" for a combined award of 35+35+105+35+35=245. Since the revealed outcome for expander element 511 is a "vertical ALL", then the player is awarded all of the awards in that column, which is 70+70+70+35+35=280. The total award is therefore 245+280=525 credits, as communicated in the BONUS meter in the upper portion of the display. Note that as discussed, the outcome of selectable element 519 is awarded twice since it is both a selected element and since it lies in the column of the "vertical ALL" selected selectable element.

Figure 8:
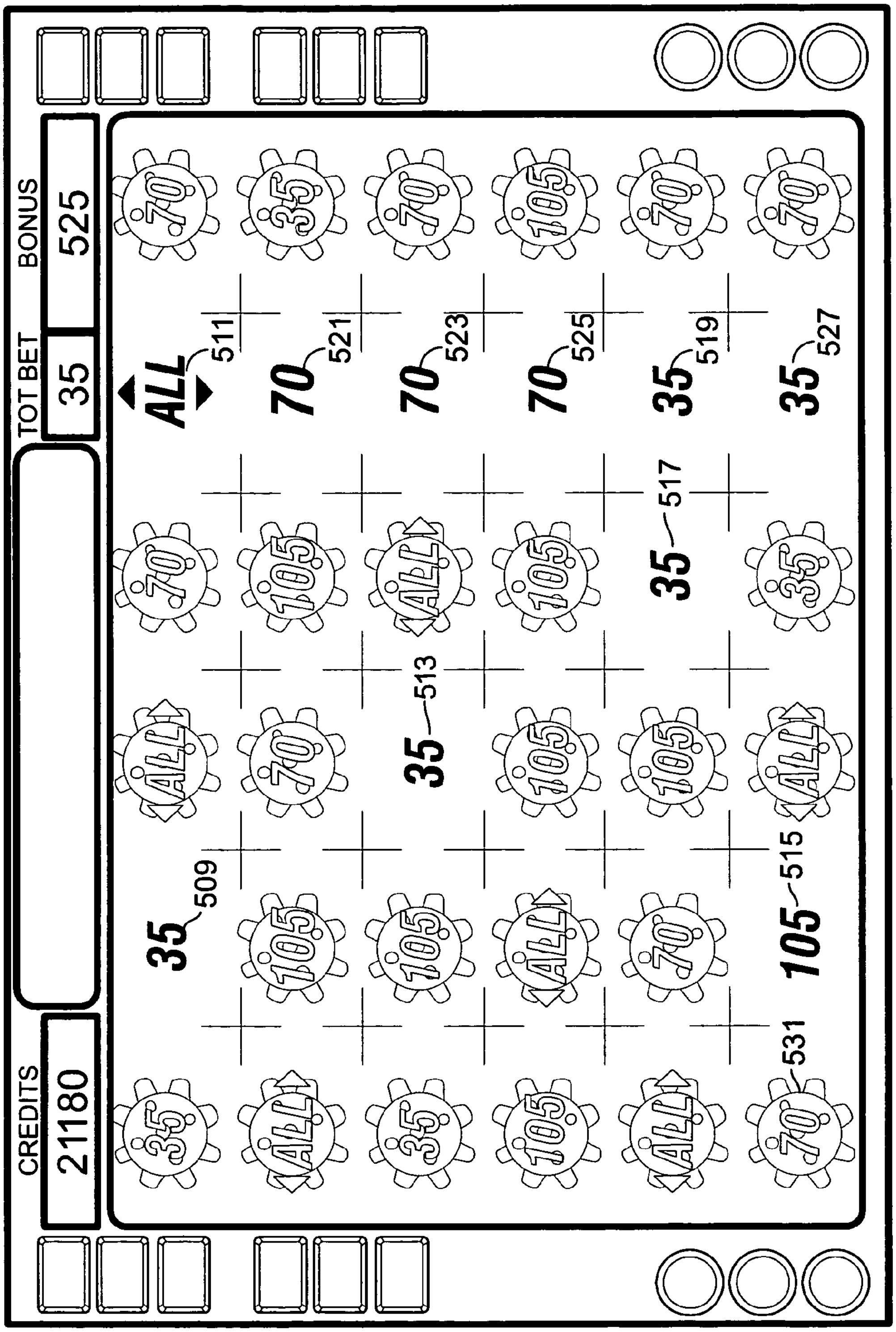
FIG. 8 is an image of a selection screen of a wagering game that may be displayed on a gaming terminal, according to an embodiment of the present invention in which all non-selected outcomes of selectable elements are revealed.

FIG. 8 is an image of a selection screen of a wagering game that may be displayed on a gaming terminal, according to an embodiment of the present invention in which all non-selected outcomes of selectable elements are revealed. In this example, after the outcomes of the selected mines 509, 511, 513, 515, 517, 519 and the mines 521, 523, 525, 527 in the expanded column of mine 511 are revealed to the player, the remaining mines (non-selected selectable elements) 531 are revealed to the player. This enables the player to observe where the expander elements were populated. This encourages the player to continue playing because he may believe he can improve his odds of winning by learning how the grid is populated with the expander elements. This also provides the player with an opportunity to learn patterns of how the expander elements are populated into the matrix 503, as relevant to the discussion below.

Figure 9:
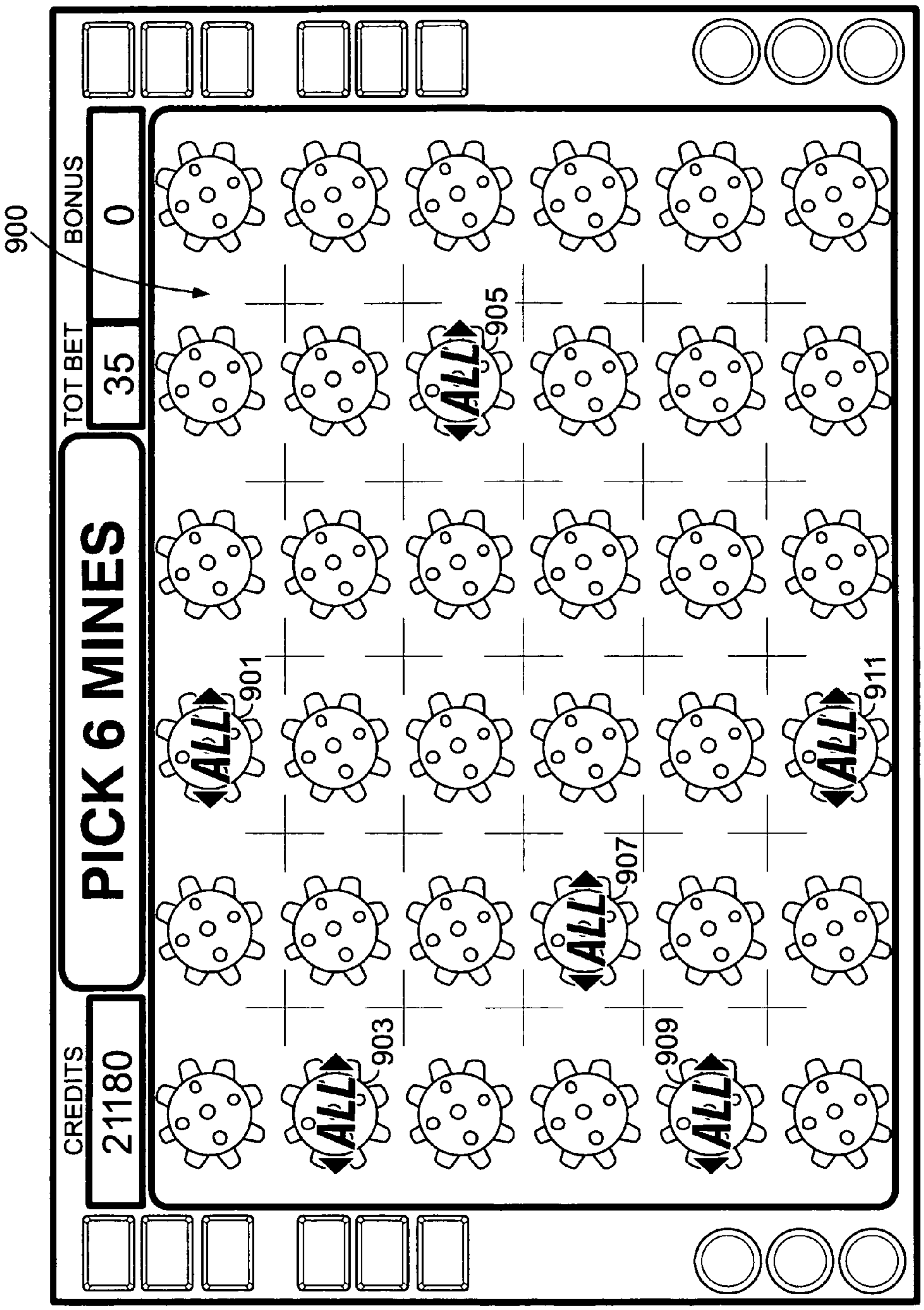
FIG. 9 is an image of a selection screen of a wagering game that may be displayed on a gaming terminal, according to an embodiment of the present invention in which one expander element is populated in each row.
Figure 10:
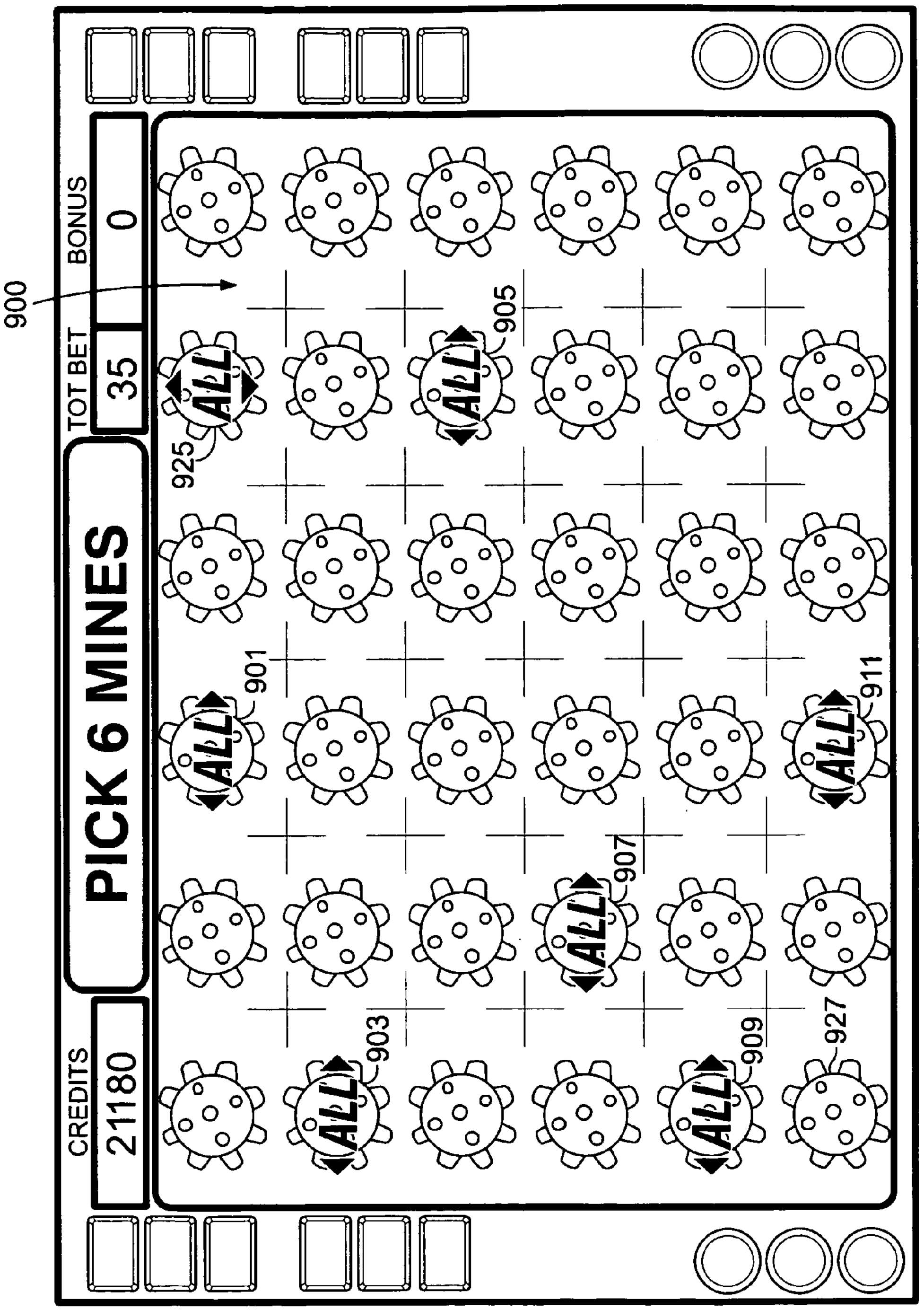
FIG. 10 is an image of a selection screen of a wagering game that may be displayed on a gaming terminal, according to an embodiment of the present invention in which one expander element is populated in each row, and in which a further expander element is populated in one of the columns.

FIGS. 9 and 10 depict a method of populating expander elements into the selection field. Populating the grid refers to the creating a relationship between the selectable elements and their respective outcomes, for example, award elements and expander elements. Before the player makes his selection, a controller in communication with the gaming terminal or system populates the field of selectable elements, and may assign the expander elements to certain selectable elements based on a predetermine procedure or algorithm. Alternatively, such population may be random, or may be partially randomized. The remaining selectable elements may then be assigned award elements or other outcomes. There are different scenarios for populating the grid with award elements and expander elements. It is also possible to use other types of elements, such as elements that have no associated award, or those that produce an award only in combination with another selectable element. In general, the grid may be populated with a set number of expander elements, or the number of expander elements may change with each new game played.

In embodiments where the population of the expander elements into the selection field is according to algorithm or procedure, it may be possible for a player to "strategize" and learn how the population occurs through many plays of the game. The shrewd player may then utilize that knowledge to control or affect the volatility of the gaming experience he or she encounters, as explained with respect to FIGS. 9-11. However, it should be recognized that although a player learning the population algorithm can affect his volatility, he cannot change the expected value of the award he or she receives. Thus, such strategic play can be utilized to dampen the volatility of the outcomes of the player's selections as explained further herein. In this way, this feature provides an additional interesting challenge for the player. The population algorithms in some embodiments, when learned by a player, may provide an avenue for the player to affect the volatility of their gaming experience, while others may not.

FIG. 9 is an image of a selection screen of a wagering game that may be displayed on a gaming terminal, according to an embodiment of the present invention in which one expander element is populated in each row. In this further embodiment the matrix or grid 900 is populated with seven expander elements. First, the population algorithm causes six expander elements 901, 903, 905, 907, 909, 911 to populate the grid in a particular manner. The six expander elements 901, 903, 905, 907, 909, 911 are each assigned the same direction of expansion, which may be either vertical or horizontal. Such direction is chosen at random as part of the population algorithm. Once the common direction is known, then one of each of such six expander elements 901, 903, 905, 907, 909, 911 is placed in each row or column depending on the selected direction. If a vertical expansion direction is selected, then one of each of the six expander elements 901, 903, 905, 907, 909, 911 is placed in each column. If a horizontal expansion direction is selected (as shown in FIG. 9), then one of each of the six expander elements 901, 903, 905, 907, 909, 911 is placed in each row.

FIG. 10 is an image of a selection screen of a wagering game that may be displayed on a gaming terminal, according to an embodiment of the present invention in which one expander element is populated in each row, and in which a further expander element is populated. As seen in FIG. 10, once the six same-direction expander elements 901, 903, 905, 907, 909, 911 (in this case horizontal) have been placed into the matrix, a seventh and final expander element 925 is randomly placed in the grid. The seventh expander element 925 has a direction of expansion, which is opposite that of the remaining six expander elements 901, 903, 905, 907, 909, 911. Thus, if the six expander elements were selected to be vertically expanding elements by the population algorithm, then the seventh expander element would be a horizontally expanding element. Since the six expander elements 901, 903, 905, 907, 909, 911 have been selected to be horizontally expanding elements, the seventh expander element 925 is a vertical expander. In one embodiment, the seventh expander element 925 is randomly selected from the remaining elements in the grid so as to not coincide with the previously selected six expander elements 901, 903, 905, 907, 909, 911. In an alternative embodiment, the seventh expander element 925 is randomly selected from all elements in the grid such that it is possible for a vertical and horizontal expander to coincide on the same selectable element. In an embodiment, the remaining selectable elements are populated with randomly selected award amounts, as discussed.

Figure 11:
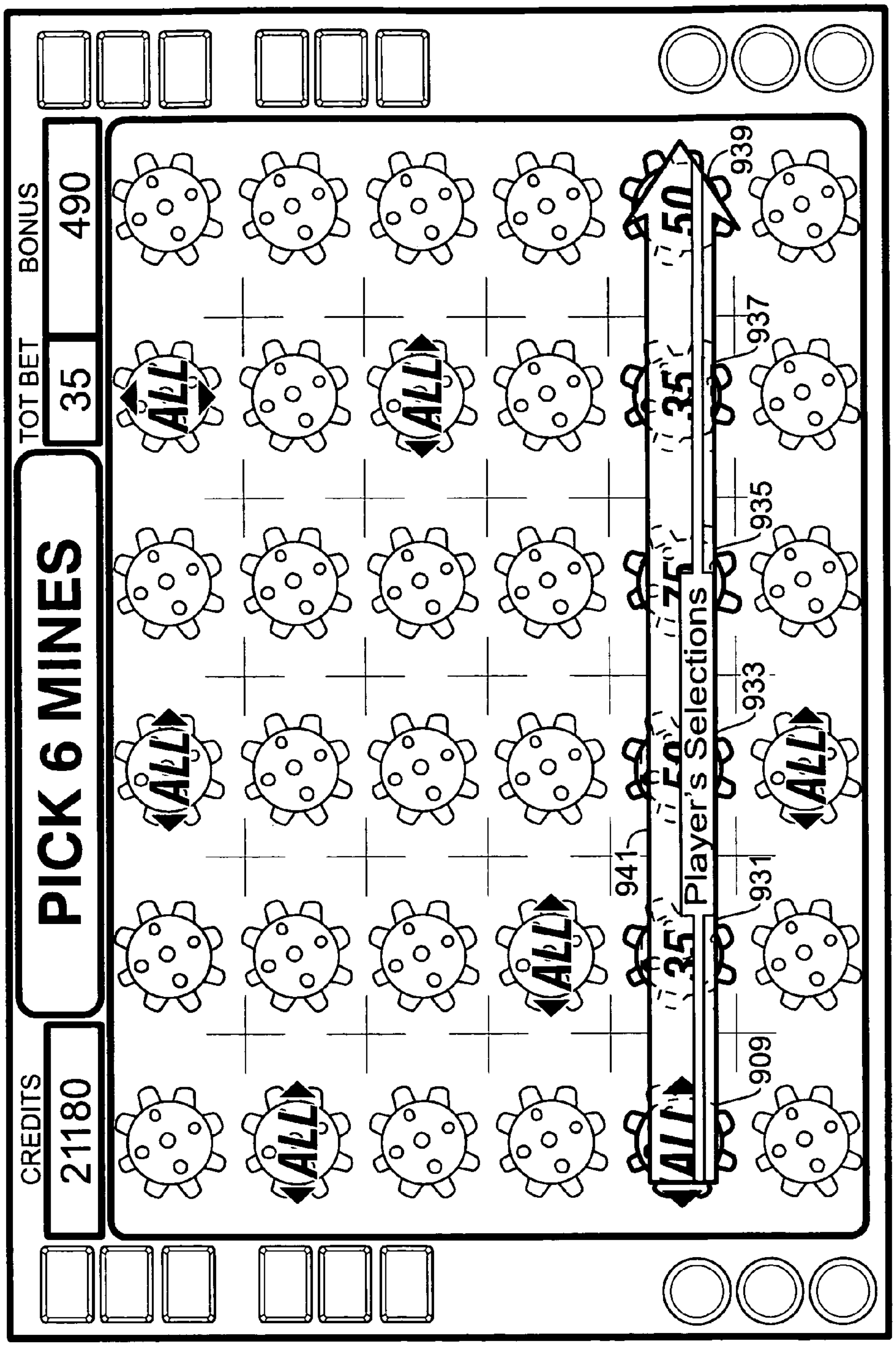
FIG. 11 is an image of a selection screen of a wagering game that may be displayed on a gaming terminal, according to an embodiment of the present invention in which, when a player selects an entire row, outcomes of all elements in the row are revealed and all associated awards are awarded to the player.

FIG. 11 is an image of a selection screen of a wagering game that may be displayed on a gaming terminal, according to an embodiment of the present invention in which, a player has made selections in an attempt to control volatility of outcomes, as discussed previously herein. In this instance, the player selects an entire row (the fifth row) and outcomes of all elements in the row are revealed and all associated awards are awarded to the player. The player, for example, has dragged his finger horizontally across a touch screen to select all of the selectable elements in that row (in the direction of the "player's selections" arrow 941). Using the population method depicted in FIGS. 9 and 10 and after playing the game a number of times, the player may have learned that either (i) each row has a "horizontal ALL" element in it, or (ii) each column has a "vertical ALL" element in it. Thus, to maximize his chances of getting at least one expander element, the player has decided to select an entire row or column, in this case a row. Therefore, the player selects six mines 909, 931, 933, 935, 937, and 939, which are all in the same row 941. After the player makes the selection of selectable elements 909, 931, 933, 935, 937, and 939 the respective outcomes are revealed. For example, the selection of selectable element 909 results in an expander element in row 941. The award elements 931, 933, 935, 937, and 939 have awards of 35, 50, 75, 35, and 50, respectively. Therefore, the total award for the award elements 931, 933, 935, 937, and 939 is "245". However, since selectable element 909 is a "horizontal ALL" expander element each of the awards of the award elements 931, 933, 935, 937, and 939 is again awarded to the player, as described herein. Thus, the player receives a total of 490 credits, as depicted in the BONUS credit meter.

By selecting a whole row (or column), the player has greater than a fifty-fifty chance of getting at least one expander because the player has a fifty-fifty chance of selecting one of the six same-direction expanders and an additional probability of selecting the one opposite-direction expander. If he selects a row, and the six common direction expander elements populated into the grid are horizontal expanders (one in each row), he is guaranteed to get at least one expander element, by definition. Similarly, if he selects a column, and the six common direction expander elements populated into the grid are vertical expanders (one in each column), he is guaranteed to get at least one expander element. Thus, the only variable in such a "whole row" or "whole column" selection is whether or not the player has selected a line of elements in the same direction as the six common direction expander elements. This gives the player greater than a fifty percent chance of getting at least one expander element. Additionally, however, by selecting a whole row or column the player is unlikely to get more than one expander element, since they are distributed according to the population algorithm, one per row, or one per column. By making selections randomly and all over the grid, the player has a greater chance of selecting multiple expander elements, but also a greater chance of getting no expander elements. Thus, by having learned the method of populating the grid, there is a degree of control of the volatility of the game. Using the random selection process, the player will have some plays where multiple expander elements result in larger credit awards, and some plays where relatively low credit awards are achieved due to few or no expander elements being selected. By using the "line selection method" described, the player is much more likely to get a relatively middle sized credit award due to the chances of including at least one expander element.

In various alternative embodiments, each of the award elements may have various types of awards associated therewith or may have more that one award associated therewith. Each of the expander elements may also have various types of awards associated therewith, may have more that one award associated therewith, or may have no award associated therewith.

The expander elements may be divided into first and second sets of expander elements wherein the first set of expander elements may be assigned a first direction of expansion, and the second set of expander elements may be assigned a second direction of expansion. The first direction of expansion may be different from the second direction of expansion. The expander elements may also be divided into more than two sets, and the directions of expansion may be more than two directions. An expander element may also have more than one direction of expansion. For example, if an expansion element in a respective row and a respective column is selected, then all expansion and award elements lying in the respective row may be awarded to the player, and all expansion and award elements lying in the respective column may be awarded to the player. The grids for the selectable elements may have a variety of different configurations.

Embodiments of the present method and apparatus may have different methods of populating the selectable elements of the grid. For example, the grid population method may comprise populating the selectable elements with one respective first expander element placed in a randomly selected position in each row of the plurality of rows, and populating the selectable elements with the at least one expander element in one randomly selected column of the plurality of columns. Alternatively, the grid population method may comprise populating the selectable elements with one respective first expander element placed in a randomly selected position in each column of the plurality of columns, and populating the selectable elements with the at least one expander element in one randomly selected row of the plurality of rows. Other grid population methods may be used with the present method and apparatus.

Each of these embodiments and obvious variations thereof is contemplated as falling within the spirit and scope of the claimed invention. Also, any combination of one or more of the above-described embodiments is within the spirit and scope of the claimed invention, which is set forth in the following claims.

What is claimed is:

1. A method of conducting a wagering game on a gaming machine comprising a display, an input device, and a controller, the controller executing instructions to perform the method comprising:

receiving, via the input device, a wager from a player;

displaying, via the display device, a plurality of selectable elements arranged in an array, each of the selectable elements associated with a respective outcome;

receiving a plurality of selections from the player to select a quantity of the selectable elements while the respective outcomes are hidden, wherein the quantity is greater than one;

after receiving the plurality of selections, revealing on the display device the respective outcomes associated with the selected elements;

for each revealed outcome which indicates an award, providing, via the controller, the award to the player; and for each revealed outcome which indicates an expander element, revealing additional respective outcomes associated with all selectable elements in a direction of expansion, within the array, associated with the expander element, and if any such revealed additional outcomes indicate an award, providing, via the controller, such award to the player.

2. The method of claim 1, wherein the array comprises a plurality of rows and columns of selectable elements.

3. The method of claim 2, wherein the method further comprises populating the selectable elements with one respective first expander element placed in a randomly selected position in each row of the plurality of rows.

4. The method of claim 3, wherein the method further comprises populating the selectable elements with at least one second expander element in one randomly selected column of the plurality of columns.

5. The method of claim 2, wherein the method further comprises populating the selectable elements with one respective first expander element placed in a randomly selected position in each column of the plurality of columns.

6. The method of claim 5, wherein the method further comprises populating the selectable elements with at least one second expander element in one randomly selected row of the plurality of rows.

7. The method of claim 1, wherein a respective award of a respective selected element is awarded twice if the respective selected element has an outcome which indicates the respective award, and if the respective selected element also lies in the direction of expansion of a selected expander element.

8. A gaming system for conducting a wagering game, the system comprising:

a wager input device receiving a wager from a player associated with the wagering game;

at least one display; and at least one controller configured to:

(i) cause the display to display the wagering game, the wagering game comprising a plurality of selectable elements arranged in a geometric array, each of the selectable elements associated with a respective outcome;

(ii) detect receipt of a plurality of selections from a player to select a quantity of the selectable elements while the respective outcomes are hidden, wherein the quantity is greater than one;

(iii) after receiving the plurality of selections, reveal the respective outcomes associated with the selected elements;

(iv) for each revealed outcome which indicates an award, provide the award to the player; and (v) for each revealed outcome which indicates an expander element, reveal additional respective outcomes associated with all selectable elements in a direction of expansion, within the geometric array, associated with the expander element, and if any such additional revealed respective outcomes indicate a respective award, provide such award to the player.

9. The gaming system of claim 8, wherein the geometric array comprises a plurality of rows and columns of selectable elements.

10. The gaming system of claim 8, wherein the selectable elements include a plurality of expander elements.

11. The gaming system of claim 10, wherein the plurality of expander elements are populated into the geometric array in accordance with a population algorithm, the population algorithm populating at least a subgroup of the plurality of expander elements into the geometric array in a non-random manner.

12. The gaming system of claim 10, wherein at least one of the expander elements has a first direction of expansion, and at least another one of the expander elements has a second direction of expansion, the second direction of expansion different from the first direction of expansion.

13. A method of conducting a wagering game on a gaming machine comprising a display, an input device, and a controller, the controller executing instructions to perform the method comprising:

receiving, via the input device, a wager from a player;

displaying, via the display device, a plurality of selectable elements arranged in an array comprising a plurality of rows and columns, each of the selectable elements associated with a respective outcome;

populating the selectable elements with a plurality of award elements and a plurality of expander elements according to one of:

locating a respective horizontal expander element in each row of the award elements, and locating a further respective vertical expander element in at least one column of the award elements, and locating a respective vertical expander element in each column of the award elements, and locating a further respective horizontal expander element in at least one row of the award elements;

receiving a plurality of selections from the player to select a quantity of the selectable elements while the respective outcomes are hidden, wherein the quantity is greater than one;

after receiving the plurality of selections, revealing on the display device the outcomes associated with the selected elements;

for each revealed outcome which indicates an award, providing, via the controller, the award to the player; and for each revealed outcome which indicates an expander element, revealing additional respective outcomes associated with all selectable elements in a direction of expansion, within the array, associated with the expander element, and if any such revealed additional respective outcomes indicate an award, providing, via the controller, such award to the player.

14. The method of claim 13, wherein a respective award of a respective selected selectable element is awarded twice if the respective selected element has an outcome which indicates the respective award, and if the respective selected element also lies in a direction of expansion of a selected expander element.

15. The method of claim 13, wherein the populating step is performed by a population algorithm, the population algorithm populating at least a subgroup of the plurality of expander elements into the array in a non-random manner.

16. A method of conducting a wagering game on a gaming machine comprising a display, an input device and a controller, the controller executing instructions to perform the method comprising:

receiving, via the input device, a wager from a player;

displaying, via the display device, a plurality of selectable elements arranged in an array including a plurality of rows and columns;

populating the selectable elements with respective outcomes, the respective outcomes including a plurality of award elements and a plurality of expander elements, each of the plurality of award elements being associated with a respective award;

assigning a first direction of expansion to a set of first expander elements of the plurality of expander elements, and assigning a second direction of expansion to at least one second expander element of the plurality of expander elements, the second direction of expansion being different from the first direction of expansion;

receiving a plurality of selections from the player to select a quantity of the selectable elements while the respective outcomes are hidden, wherein the quantity is greater than one;

after receiving the plurality of selections, revealing on the display device the respective outcome associated with each selected element;

in response to each revealed outcome indicating an award element, awarding, via the controller, the respective award associated with the selected award element;

in response to each revealed element indicating a first expander element, revealing additional respective outcomes associated with each selectable element lying in the first direction within the array, and if such revealed additional respective outcomes indicate an additional award element, provide, via the controller, the respective award associated with each additional award element to the player; and in response to each revealed element indicating the at least one second expander element, revealing additional respective outcomes associated with each selectable element lying in the second direction within the array, and if such revealed additional respective outcomes indicate an additional award element, provide, via the controller, the respective award associated with each additional award element to the player.

17. The method of claim 16, wherein the first direction of expansion is in the direction of the rows, and wherein the second direction of expansion is in the direction of the columns.

18. The method of claim 16, wherein the first direction of expansion is in the direction of the columns, and wherein the second direction of expansion is in the direction of the rows.

19. The method of claim 16, wherein the method further comprises populating the selectable elements with one respective first expander element placed in a randomly selected position in each row of the plurality of rows.

20. The method of claim 19, wherein the method further comprises populating the selectable elements with the at least one second expander element in one randomly selected column of the plurality of columns.

21. The method of claim 16, wherein the method further comprises populating the selectable elements with one respective first expander element placed in a randomly selected position in each column of the plurality of columns.

22. The method of claim 21, wherein the method further comprises populating the selectable elements with the at least one second expander element in one randomly selected row of the plurality of rows.

23. The method of claim 16, wherein the populating step is performed by a population algorithm, the population algorithm populating at least a subgroup of the plurality of expander elements into the array in a non-random manner.

24. The method of claim 23, wherein the subgroup includes the set of first expander elements.

25. A gaming system for conducting a wagering game, the system comprising:

a wager input device receiving a wager;

a display for displaying the wagering game; and at least one controller configured to:

(i) cause the display to display the wagering game which comprises a plurality of selectable elements arranged in a geometric array;

(ii) populate the selectable elements with respective outcomes, the respective outcomes including a plurality of award elements and a plurality of expander elements, each of the plurality of award elements having an association with a respective award;

(iii) assign a first direction of expansion to a set of first expander elements of the plurality of expander elements, and assign a second direction of expansion to the at least one second expander element of the plurality of expander elements, the second direction being different from the first direction of expansion;

(iv) detect receipt of a plurality of selections from a player to select a quantity of the selectable elements while the respective outcomes are hidden, wherein the quantity is greater then one;

(v) after receiving the plurality of selections, revealing the respective outcomes associated with the selected elements;

(vi) in response to each revealed outcome indicating an award element, award the respective award associated with the award element;

(vii) in response to each revealed outcome indicating a first expander element, revealing additional respective outcomes associated with each selectable element lying in the first direction within the geometric array, and if such revealed additional respective outcomes indicate an additional award element, provide the respective award associated with each additional award element; and (viii) in response to each revealed outcome indicating the second expander element, revealing additional respective outcomes associated with each selectable element lying in the second direction within the geometric array, and if such revealed additional respective outcomes indicate an additional award element, provide the respective award associated with each additional award element.

26. The gaming system of claim 25, wherein the controller populates the selectable elements in accordance with a population algorithm, the population algorithm requiring at least a subgroup of the plurality of expander elements to be populated into the geometric array in a non-random manner.

27. The gaming system of claim 26, wherein the subgroup includes the set of first expander elements.

* * * * *